United States Patent
Yamanaka et al.

(10) Patent No.: US 9,488,866 B2
(45) Date of Patent: *Nov. 8, 2016

(54) OPTICAL LAMINATE, OPTICAL ELEMENT AND LIQUID CRYSTAL DISPLAY DEVICE

(75) Inventors: Shunsuke Yamanaka, Takaoka (JP); Kohei Arakawa, Machida (JP)

(73) Assignee: ZEON CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/957,041

(22) Filed: Nov. 30, 2010

(65) Prior Publication Data

US 2011/0069257 A1 Mar. 24, 2011

Related U.S. Application Data

(63) Continuation of application No. 10/593,590, filed on Sep. 21, 2006, now Pat. No. 7,964,254.

(30) Foreign Application Priority Data

Mar. 23, 2004 (JP) .................................. 2004-84969

(51) Int. Cl.
*G02F 1/13363* (2006.01)
*G02B 5/30* (2006.01)

(52) U.S. Cl.
CPC ........... *G02F 1/13363* (2013.01); *G02B 5/305* (2013.01); *G02F 2001/133637* (2013.01); *Y10T 156/1043* (2015.01); *Y10T 428/1036* (2015.01); *Y10T 428/1041* (2015.01)

(58) Field of Classification Search
CPC ............... G02B 5/305; G02F 1/13363; G02F 2001/133637
USPC .................... 428/1.3, 1.31, 1.5; 349/117–122
See application file for complete search history.

(56) References Cited

U.S. PATENT DOCUMENTS

| | | | |
|---|---|---|---|
| 4,985,285 A | 1/1991 | Ichikawa et al. | |
| 5,138,474 A | 8/1992 | Arakawa | |
| 5,189,538 A | 2/1993 | Arakawa | |
| 5,245,456 A | 9/1993 | Yoshimi et al. | |
| 5,337,174 A | 8/1994 | Wada et al. | |
| 5,430,565 A | 7/1995 | Yamanouchi et al. | |
| 5,485,295 A * | 1/1996 | Itoh et al. | 349/117 |
| 5,543,948 A | 8/1996 | Takahashi et al. | |
| 5,880,800 A * | 3/1999 | Mikura et al. | 349/122 |
| 6,184,957 B1 | 2/2001 | Mori et al. | |
| 6,346,578 B2 | 2/2002 | Arakawa | |
| 6,552,145 B1 | 4/2003 | Okada et al. | |
| 6,812,983 B2 | 11/2004 | Arakawa | |
| 7,038,744 B2 | 5/2006 | Kuzuhara et al. | |
| 7,101,498 B2 * | 9/2006 | Sekiguchi et al. | 252/586 |
| 7,361,390 B2 | 4/2008 | Yoda et al. | |
| 2001/0008920 A1 | 7/2001 | Arakawa | |
| 2002/0005925 A1 | 1/2002 | Arakawa | |
| 2002/0060762 A1 | 5/2002 | Arakawa | |
| 2003/0011732 A1 * | 1/2003 | Ishihara et al. | 349/117 |
| 2003/0067574 A1 | 4/2003 | Sasaki et al. | |
| 2003/0125503 A1 | 7/2003 | Sakamoto et al. | |
| 2004/0021814 A1 | 2/2004 | Elman et al. | |
| 2004/0063887 A1 * | 4/2004 | Toyomasu et al. | 526/307.2 |
| 2004/0114067 A1 | 6/2004 | Kubomura et al. | |
| 2005/0266239 A1 * | 12/2005 | Satake et al. | 428/354 |
| 2006/0066787 A1 | 3/2006 | Yoda et al. | |
| 2009/0081387 A1 | 3/2009 | Suzuki | |

FOREIGN PATENT DOCUMENTS

| | | |
|---|---|---|
| EP | 0 424 951 A1 | 5/1991 |
| JP | 1-118819 A | 5/1989 |
| JP | 01-127329 A | 5/1989 |
| JP | 2-160204 A | 6/1990 |
| JP | 2-256023 A | 10/1990 |
| JP | 5-157911 A | 6/1993 |
| JP | 10-54982 A | 2/1998 |
| JP | 2000-141567 A | 5/2000 |
| JP | 2002-40258 A | 2/2002 |
| JP | 2002-107542 A | 4/2002 |
| JP | 2002-321302 A | 5/2002 |
| JP | 2003-90912 A | 3/2003 |
| JP | 2004-58369 A | 2/2004 |

OTHER PUBLICATIONS

JPO Website Machine English Translation of JP 2000-141567, Murooka et al., May 23, 2000.*
JPO Website Machine English Translation of JP 2005-031557, Shimodaira et al., Feb. 3, 2005.*
Characterizing Birefringent Materials:PET, Scientific Computing International, Oct. 2013.*
Optical Properties, Case Studies, J-OCTA, JSOL Corporation, Oct. 2013.*
Glass transition, Wikipedia, Wikimedia Foundation, Oct. 16, 2013.*

* cited by examiner

*Primary Examiner* — Sophie Hon
(74) *Attorney, Agent, or Firm* — Birch, Stewart, Kolasch & Birch, LLP

(57) ABSTRACT

An optical laminate having layer A having a resin having a negative intrinsic birefringence and at least one layer B having a transparent resin, having substantially no orientation and laminated at least on one face of layer A and satisfies a relation |Re(A)|>|Re(B)|, wherein Re(A) and Re(B) represent in-plane retardations of layer A and layer B, respectively, measured with light having a wavelength of 400 to 700 nm, an optical element having a laminate of the optical laminate and a polarizer plate, and a liquid crystal display device using at least one sheet of the optical laminate. In the liquid crystal display device, optical compensation can be made in accordance with the mode of the liquid crystal display by the three dimensional control of the refractive index, and the liquid crystal display device provides an image display with liquid crystals exhibiting small change in the phase contrast depending on the viewing angle.

20 Claims, No Drawings

OPTICAL LAMINATE, OPTICAL ELEMENT AND LIQUID CRYSTAL DISPLAY DEVICE

This application is a Continuation of copending application Ser. No. 10/593,590 filed on Sep. 21, 2006 now U.S. Pat. No. 7,964,254, which is a National Phase of PCT International Application No. PCT/JP2005/005666 filed on Mar. 22, 2005, which claims the benefit of Japanese Patent Application No. 2004-84969 filed in Japan, on Mar. 23, 2004. The entire contents of all of the above applications are hereby incorporated by reference.

TECHNICAL FIELD

The present invention relates to an optical laminate, an optical element and a liquid crystal display device. More particularly, the present invention relates to an optical laminate which enables optical compensation in accordance with the mode of the liquid crystal display by the three dimensional control of the refractive index and provides a image display with liquid crystals exhibiting small change in the phase contrast depending on the viewing angle and an optical element and a liquid crystal display device using the optical laminate.

BACKGROUND ART

Liquid crystal display devices are characterized by the high quality of images, the small thickness, the light weight and the small consumption of electric power and widely used for televisions, personal computers and automobile navigators. In a liquid crystal display device, two polarizer plates are disposed above and below a liquid crystal cell in a manner such that the transmission axes are perpendicular to each other. Images are exhibited on a display by changing orientation of liquid crystal molecules under application of a voltage to the liquid crystal cell. Many of the liquid crystal display devices of the twisted nematic mode have a construction such that the liquid crystal molecules are arranged perpendicularly under application of a voltage to exhibit a dark display. Many of the liquid crystal display devices of the in-plane switching mode have a construction such that the liquid crystal molecules are oriented in a specific direction in the absence of a voltage, and the direction of the orientation is rotated by 45 degrees under application of a voltage to exhibit a white display.

In a liquid crystal display device in which the transmission axes of two polarizer plates are arranged in a manner such that one of the transmission axes is in the vertical direction, the other is in the horizontal direction, and the two axes are perpendicular to each other, a sufficient contrast can be obtained when the image display is observed in the horizontal and vertical directions. However, when the image display is observed in an oblique direction deviated from the horizontal and vertical directions, the transmission axis of the polarizer plate at the incident side and the transmission axis of the polarizer plate at the output side are not perpendicular to each other in observation. The linear polarized light is not completely shut off, and leak of light arises. A sufficient dark display is not obtained, and the contrast decreases. To overcome this problem, prevention of the decrease in the contrast by adding a means for optical compensation to the liquid crystal display device is attempted.

In Patent Reference 1, (1) a phase contrast film satisfying the relation $0.92 \leq R_{40}/Re \leq 1.08$ is disclosed, wherein the retardation is represented by Re when a monochromic light having a wavelength of 632.8 nm is incident in the perpendicular direction and the retardation is represented by $R_{40}$ when a monochromic light having a wavelength of 632.8 nm is obliquely incident at an angle of 40° with respect to the normal of the face of the film.

In Patent Reference 2, (2) a film exhibiting birefringence characterized in that a group of molecules oriented in the direction of the plane of the film and a group of molecules oriented in the direction of the thickness of the film are mixed together, and a process for producing the film exhibiting birefringence characterized in that a shrinking film is adhered to one or both faces of a resin film to form a laminate when the resin film is stretched, and the shrinking force in the direction perpendicular to the direction of the stretching of the film is provided by stretching the laminate under heating, are disclosed.

In Patent Reference 3, (3) a liquid crystal display device in which film (A) transmitting light has at least one light axis or a beam axis in the range of 45° around the normal direction as the reference direction or satisfies the relation $n_{TH}-(n_{MD}+n_{TD})/2>0$, wherein the refractive index of the film in the direction of the normal is represented by $n_{TH}$, the refractive index in the longitudinal direction is represented by $n_{MD}$ and the refractive index in the axial direction is represented by $n_{TD}$, and at least one sheet of film (A) described above and at least one sheet of uniaxially stretched film (B) comprising a macromolecule having a positive intrinsic birefringence and transmitting light are inserted between a liquid crystal cell and a polarizer plate, is disclosed. As film (A) described above, a laminate having a biaxially or uniaxially stretched film comprising a material having a negative intrinsic birefringence is described.

In Patent Reference 4, a phase contrast plate which comprises a material having a positive intrinsic birefringence and a material having a negative intrinsic birefringence and satisfies the relation $Re(450)<Re(550)<Re(650)$, wherein the retardations at wavelengths of 450 nm, 550 nm and 650 nm are represented by Re(450), Re(550) and Re(650), respectively, is disclosed. In accordance with this reference, the production can be conducted in accordance with simple steps, and a uniform phase contrast can be provided with respect to incident light in the entire range of the visible light.

However, problems are found when a film is produced in accordance with the processes described in the above references. For example, the unevenness in the retardation is great and the efficiency of production is poor in the process described in Patent Reference 1. This process has another problem in that it is difficult that a product having a great size which can be applied to liquid crystal display devices having a great size such as those used for high density television is obtained.

In the process described in Patent Reference 2, it is necessary that the ratio of the stretching and the shrinkage be accurately controlled. This causes a problem in that the production process is complicated, and the efficiency of production is poor.

It may be considered that the film used for liquid crystal devices disclosed in Patent Reference 3 can be produced relatively easily and the phase contrast can be controlled easily, in particular, when a biaxially or uniaxially stretched film having a negative intrinsic birefringence is used as film (A). However, it is actually difficult that a phase contrast film is prepared by stretching a film of a material having a negative intrinsic birefringence such as a vinyl aromatic polymer which is preferable due to a great absolute value of the intrinsic birefringence and excellent transparency. In other words, longitudinal uniaxial stretching by zone heating or transverse uniaxial stretching by a tenter or consecutive biaxial stretching or successive biaxial stretching by a combination of the above uniaxial stretching is necessary for exhibiting the advantageous phase contrast (the retardation) and keeping uniformity of the phase contrast. However, the film tends to be broken during the stretching due to insufficient strength of the material used for the stretching. The exhibition of the desirable phase contrast is suppressed and tends to be fluctuated when the stretching is conducted at a high temperature so that the film is not broken. Therefore, no practically applicable phase contrast film made of a material having a negative intrinsic birefringence and satisfying the relation $n_{TH}-(n_{MD}+n_{TD})/2>0$ is existent.

Preparation of a phase contrast film having substantially no in-plane retardation and a refractive index in the direction of thickness greater than the refractive index in the direction of plane (a so-called positive retarder) is made possible by biaxial stretching of a film comprising a material having a negative intrinsic birefringence, and the application to the film compensating the phase contrast of a display device using cholesteric liquid crystals, for example, can be expected. However, the film tends to be broken during stretching due to insufficient strength of the material used for the stretching, and the exhibition of the desirable phase contrast is suppressed and tends to be fluctuated when the stretching is conducted at a high temperature so that the film is not broken. Therefore, no practically applicable film is existent.

The phase contrast plate described in Patent Reference 4 has an insufficient angle of field, and a further improvement is desired.

[Patent Reference 1] Japanese Patent Application Laid-Open No. Heisei 2(1990)-160204

[Patent Reference 2] Japanese Patent Application Laid-Open No. Heisei 5(1993)-157911

[Patent Reference 3] Japanese Patent Application Laid-Open No. Heisei 2(1990)-256023

[Patent Reference 4] Japanese Patent Application Laid-Open No. 2002-40258

The present invention has an object of providing an optical laminate which enables optical compensation in accordance with the mode of the liquid crystal display by the three dimensional control of the refractive index and provides a image display with liquid crystals exhibiting small change in the phase contrast depending on the viewing angle and an optical element and a liquid crystal display device using the optical laminate.

DISCLOSURE OF THE INVENTION

As the result of intensive studies by the present inventors to overcome the above problems, it was found that an excellent image display with liquid crystals exhibiting small change in the phase contrast depending on the viewing angle could be obtained by preparing an optical element by laminating a polarizing plate with an optical laminate which was obtained by laminating a layer comprising a transparent resin and having substantially no orientation to a layer having a negative intrinsic birefringence and satisfied the condition such that the absolute value of the in-plane retardation of the layer having a negative intrinsic birefringence was greater than the absolute value of the in-plane retardation of the layer comprising a transparent resin and having substantially no orientation and by mounting the prepared optical element into a liquid crystal display device.

The present invention provides:

(1) An optical laminate (optical laminate C) which comprises a layer (layer A) comprising a resin having a negative intrinsic birefringence and at least one layer (layer B) comprising a transparent resin, having substantially no orientation and laminated at least on one face of layer A and satisfies a relation $|Re(A)|>|Re(B)|$, wherein $Re(A)$ and $Re(B)$ represent an in-plane retardation of layer A and an in-plane retardation of layer B, respectively, measured with light having a wavelength of 400 to 700 nm;

(2) The optical laminate according to (1), wherein $|Re(B)|$ is 20 nm or smaller;

(3) The optical laminate according to any one of (1) and (2), which satisfies a relation $Tg(A)>Tg(B)+20$, wherein $Tg(A)$ and $Tg(B)$ represent glass transition temperatures in °C. of the resin of layer A and the resin of layer B, respectively;

(4) The optical laminate according to any one of (1) to (3), which satisfies a relation $Re(450)>Re(550)>Re(650)$, wherein $Re(450)$, $Re(550)$ and $Re(650)$ represent in-plane retardations at wavelengths of 450 nm, 550 nm and 650 nm, respectively;

(5) The optical laminate according to any one of (1) to (4), which satisfies a relation $\Sigma nz>\Sigma ny-0.002$, wherein $\Sigma nz$ represents a refractive index in a direction of a thickness and $\Sigma ny$ and $\Sigma nx$ represent refractive indices in two directions which are perpendicular to the direction of a thickness and perpendicular to each other of optical laminate C measured with light having a wavelength of 550 nm, and $\Sigma nx$, $\Sigma ny$ and $\Sigma nz$ satisfy relations $\Sigma nx<\Sigma ny$ and $\Sigma nx<\Sigma nz$;

(6) The optical laminate according to any one of (1) to (5), wherein an unevenness in a thickness of layer A is 3.0% or smaller of an average thickness of layer A;

(7) The optical laminate according to any one of (1) to (6), wherein the resin having a negative intrinsic birefringence is a resin selected from a group consisting of vinyl aromatic polymers, polyacrylonitrile polymers and polymethyl methacrylate polymers;

(8) The optical laminate according to any one of (1) to (7), wherein the resin having a negative intrinsic birefringence is a vinyl aromatic polymer;

(9) The optical laminate according to any one of (1) to (8), wherein the resin having a negative intrinsic birefringence is a resin selected from a group consisting of polystyrene and copolymers of styrene and maleic anhydride;

(10) The optical laminate according to any one of (1) to (9), wherein the transparent resin is a resin having an alicyclic structure;

(11) The optical laminate according to any one of (1) to (10), wherein the transparent resin is a norbornene polymer;

(12) The optical laminate according to any one of (1) to (11), wherein the transparent resin is a hydrogenation product of a ring-opening polymer of a norbornene monomer or a hydrogenation product of a ring-opening copolymer of a norbornene monomer;

(13) The optical laminate according to any one of (1) to (12), wherein the transparent resin has a tensile elongation at break of 30% or greater;

(14) The optical laminate according to any one of (1) to (13), wherein the layer comprising a transparent resin and having substantially no orientation (layer B) is laminated on both faces of the layer comprising a resin having a negative intrinsic birefringence (layer A);

(15) The optical laminate according to any one of (1) to (14), wherein an adhesive layer is disposed between the layer comprising a resin having a negative intrinsic birefringence (layer A) and the layer comprising a transparent resin and having substantially no orientation (layer B);
(16) The optical laminate according to any one of (1) to (15), which satisfies relations Tg(A)>Tg(D) and Tg(B)>Tg(D), wherein Tg(D) represents a glass transition temperature or a softening point in ° C. of an adhesive in the adhesive layer;
(17) An optical element comprising a laminate of the optical laminate described in any one of (1) to (16) and a polarizer plate;
(18) A liquid crystal display device which uses at least one sheet of the optical laminate described in any one of (1) to (16); and
(19) The liquid crystal display device according to (18), wherein said liquid crystal display device comprises a liquid crystal cell of in-plane switching (IPS) mode.

THE MOST PREFERRED EMBODIMENT TO CARRY OUT THE INVENTION

The optical laminate (optical laminate C) of the present invention comprises a layer comprising a resin having a negative intrinsic birefringence (layer A) and at least one layer (layer B) comprising a transparent resin, having substantially no orientation and laminated at least on one face of layer A and satisfies the relation |Re(A)|>|Re(B)|, wherein Re(A) and Re(B) represent the in-plane retardation of layer A and the in-plane retardation of layer B, respectively, measured with light having a wavelength of 400 to 700 nm.

The intrinsic birefringence $\Delta n^0$ is a value calculated in accordance with the following equation:

$$\Delta n^0 = (2\pi/9)(Nd/M)\{(n_a^2+2)^2/n_a\}(\alpha_1-\alpha_2) \quad [1]$$

In the equation, $\pi$ represents the circle ratio, N represents the Avogadro number, d represents the density, M represents the molecular weight, $n_a$ represents the average refractive index, $\alpha_1$ represents the polarizability of the macromolecule in the direction of the molecular chain, $\alpha_2$ represents the polarizability of the macromolecule in the direction perpendicular to the direction of the molecular chain.

Examples of the resin having a negative intrinsic birefringence include vinyl aromatic polymers, polyacrylonitrile polymers, polymethyl methacrylate polymers, cellulose ester polymers and multi-component copolymers derived from these polymers. The resin having a negative birefringence may be used singly or in combination of two or more. Among these resins, vinyl aromatic polymers, polyacrylonitrile polymers and polymethyl methacrylate polymers are preferable. Vinyl aromatic polymers are more preferable due to the great tendency of exhibiting the birefringence.

Examples of the vinyl aromatic polymer include polystyrene and copolymers of styrene, α-methylstyrene, o-methylstyrene, m-methyl-styrene, p-methylsytrene, p-chlorostyrene, p-nitrostyrene, p-aminostyrene, p-carboxystyrene, p-phenylstyrene, p-methoxystyrene and p-butoxy-styrene with ethylene, propylene, butene, butadiene, isoprene, (meth)acrylonitrile, α-chloroacrylonitrile, methyl(meth)acrylate, ethyl(meth)acrylate, (meth)acrylic acid, maleic anhydride, maleimide, vinyl acetate and vinyl chloride. Among these vinyl aromatic polymers, polystyrene and copolymers of styrene with maleic anhydride are preferable.

In the present invention, it is preferable that the transparent resin forming the layer having substantially no orientation has a total light transmittance of 70% or greater, more preferably 80% or greater and most preferably 90% or greater as measured using a test piece having a thickness of 1 mm. As the above resin, for example, resins having an alicyclic structure, methacrylic resins, polycarbonates, (meth)acrylic acid ester-vinyl aromatic compound copolymer resins and polyether sulfones are preferable. Among these resins, resins having an alicyclic structure are more preferable.

Examples of the polymer resin having an alicyclic structure include (1) norbornene polymers, (2) polymers of cyclic olefins having a single ring, (3) cyclic conjugated diene polymers, (4) vinyl alicyclic hydrocarbon polymers and hydrogenation products of these polymers. Among these polymer resins, norbornene polymers are preferable from the standpoint of the transparency and the molding property.

Examples of the norbornene polymer include ring-opening polymers of norbornene monomers, ring-opening copolymers of norbornene monomers with other monomers which can be copolymerized by the ring-opening polymerization, hydrogenation products of these polymers and copolymers, addition polymers of norbornene monomers, and addition copolymers of norbornene monomers with other monomers which can be copolymerized by the addition polymerization. Among these polymers, hydrogenation products of ring-opening (co)polymers of norbornene monomers are preferable from the standpoint of the transparency.

The polymer having an alicyclic structure is selected from conventional polymers such as polymers disclosed in Japanese Patent Application Laid-Open No. 2002-321302.

The layer comprising a resin having a negative intrinsic birefringence (layer A) used in the present invention comprises the resin having a negative intrinsic birefringence alone, and the layer comprising a transparent resin (layer B) used in the present invention comprises the transparent resin alone. To the above resins, where necessary, conventional additives such as antioxidants, heat stabilizers, light stabilizers, ultraviolet light absorbents, antistatic agents, dispersants, chlorine scavengers, flame retardants, nucleating agents for crystallization, antiblocking agents, anticlouding agents, mold releases, pigments, organic and inorganic fillers, neutralizing agents, lubricants, decomposing agents, metal inactivators, antifouling agents, antibacterial agents, other resins and thermoplastic elastomers may be added as long as the effect of the present invention is not adversely affected. The amount of the additive is, in general, 0 to 5 parts by weight and preferably 0 to 3 parts by weight based on 100 parts by weight of the resin having a negative intrinsic birefringence or the transparent resin.

In the present invention, the relation |Re(A)|>|Re(B)| is satisfied when Re(A) (nm) and Re(B) (nm) represent the in-plane retardation of layer A comprising a resin having a negative intrinsic birefringence and the in-plane retardation of layer B comprising a transparent resin and having substantially no orientation, respectively, measured with light having a wavelength of 400 to 700 nm. When layer B is laminated to both faces of layer A, |Re(B)| represents the total of the in-plane retardations in the two layer B. When the relation |Re(A)|>|Re(B)| is satisfied, the optically adjusted optical properties of layer B having a negative intrinsic birefringence can be effectively utilized. In the case of the uniaxial stretching, the slow axis appears in the direction perpendicular to the direction of the stretching, and the direction of the slow axis relative to the transverse direction of the film can be adjusted by suitably selecting the condition of stretching. Therefore, the object optical element can be produced in accordance with a simple process such that the optical laminate and a polarizer plate are laminated in accordance with the roll-to-roll process. When |Re(A)|≤

|Re(B)|, there is the possibility that the function of optical compensation of the optical laminate is not sufficiently exhibited.

In the present invention, "having substantially no orientation" means that the difference in the refractive index in the x-direction $n_B x$ and the refractive index in the y-direction $n_B y$ which are perpendicular to each other in layer B is small and the value of $|(n_A x - n_A y)d_A| + |(n_B x - n_B y)d_B|$ is 1.1 times the value of $|(n_A x - n_A y)d_A|$ or smaller when the refractive index in the x-direction and the refractive index in the y-direction which are perpendicular to each other in layer A are represented by $n_A x$ and $n_A y$, respectively, the thickness of layer A is represented by $d_A$, and the thickness of layer B is represented by $d_B$.

In the present invention, it is preferable that |Re(B)| is 20 nm or smaller and more preferably 5 nm or smaller. When |Re(B)| exceeds 20 nm, there is the possibility that the function of optical compensation of the optical laminate is not sufficiently exhibited. When a plurality of layer B are present, |Re(B)| represents the total of the absolute values of the in-plane retardations of the plurality of layer B.

In the present invention, it is preferable that the relation Tg(A)>Tg(B)+20 is satisfied, and it is more preferable that the relation Tg(A)>Tg(B)+24 is satisfied when Tg(A) and Tg(B) represent the glass transition temperatures in ° C. of the resin of layer A and the resin of layer B, respectively. An unstretched laminate in which an unstretched resin layer comprising the resin having a negative intrinsic birefringence (layer a) and an unstretched resin layer comprising the transparent resin (layer b) are laminated is co-stretched, the birefringence property of layer A comprising the negative intrinsic birefringence can be sufficiently and uniformly exhibited by conducting the stretching at a temperature around Tg(A) (° C.). At this time, the macromolecules in the unstretched resin layer comprising the transparent resin (layer b) have almost no orientation and are in the condition of having substantially no orientation since the stretching is conducted at a temperature higher than the glass transition temperature Tg(B) by 20° C. or higher. By co-stretching the unstretched laminate, the steps in the production process can be decreased, and the production cost can be reduced in comparison with the separate stretching of layer A and layer B, followed by lamination of the separately stretched layers. The unstretched film comprising the resin having a negative intrinsic birefringence is not easily stretched when the film is used singly, and uneven stretching and fracture occasionally take place. By the lamination with the other transparent resin having a lower glass transition temperature, the stable stretching is made possible, and the unevenness in the thickness of layer A can be decreased. In the present invention, it is preferable that the transparent resin forming the resin layer substantially having no orientation (layer B) has a tensile elongation at break of 30% or greater and more preferably 50% or greater. When the resin layer having a tensile elongation at break of 30% or greater and the resin layer having a negative intrinsic birefringence are laminated together, the unstretched laminate can be co-stretched with stability. The tensile elongation at break is measured in accordance with the method of ASTM D638.

It is preferable that the optical laminate of the present invention satisfies the relation Re(450)>Re(550)>Re(650), wherein Re(450), Re(550) and Re(650) represent the in-plane retardations at wavelengths of 450 nm, 550 nm and 650 nm, respectively. By keeping the laminated layer B comprising the transparent resin in the condition having substantially no orientation, the property of layer A comprising the resin having a negative intrinsic birefringence which satisfies the relation Re(450)>Re(550)>Re(650) can be directly exhibited, and the optical property of the resin having a negative intrinsic birefringence can be sufficiently utilized.

In the present invention, it is preferable that the relation Σnz>Σny−0.002 is satisfied when Σnz represents the refractive index in the direction of the thickness and Σny and Σnx represent refractive indices in the directions which are perpendicular to the direction of the thickness and perpendicular to each other of optical laminate C as measured with light having a wavelength of 550 nm, and Σnx, Σny and Σnz satisfy relations Σnx<Σny and Σnx<Σnz. When the refractive indices in the x-direction, in the y-direction and in the z-direction of the resins constituting layer A and layer B are represented by $n_A x$, $n_A y$, $n_A z$, $n_B x$, $n_B y$ and $n_B z$, respectively, and the thicknesses of layer A and layer B are represented by $d_A$ and $d_B$, respectively, Σnx, Σny and Σnz are given by the following equations:

$$\Sigma nx = (n_A x \times d_A + n_B x \times d_B)/(d_A + d_B)$$

$$\Sigma ny = (n_A y \times d_A + n_B y \times d_B)/(d_A + d_B)$$

$$\Sigma nz = (n_A z \times d_A + n_B z \times d_B)/(d_A + d_B)$$

By keeping the refractive index in the direction of the thickness Σnz greater than Σny−0.002, the compensation of the phase contrast by the liquid crystal in the liquid crystal cell and the compensation of the polarizer can be conducted in the liquid crystal display device, and the birefringence due to the transmitted light can be effectively compensated. Thus, the leak of light can be prevented, and a excellent contrast can be obtained at any angle of the field.

In the present invention, it is preferable that the unevenness in the thickness of layer A comprising a resin having a negative intrinsic birefringence is 3.0% or smaller and more preferably 2.0% or smaller of the average thickness of layer A. The unevenness in the thickness is the value obtained by dividing the difference between the maximum thickness and the minimum thickness of layer A by the average value of the thickness of layer A. When the unevenness in the thickness of layer A exceeds 3.0% of the average thickness of layer A, there is the possibility that unevenness arises on the image display of the liquid crystal display device.

The optical laminate of the present invention may be treated for forming a rough surface on the layer comprising a transparent resin and having substantially no orientation. The means for forming the rough surface is not particularly limited. Examples of the means include the treatment with corona discharge, the embossing treatment, the sand blasting treatment, the etching treatment and the attachment of fine particles. The adhesive property can be improved by roughening the surface of layer B.

In the optical laminate of the present invention, it is preferable that layer B comprising a transparent resin and having substantially no orientation is laminated on both faces of layer A comprising a resin having a negative intrinsic birefringence. By laminating layer B on both faces of layer A, formation of warp in the optical laminate due to the difference in the shrinkage of the layers can be prevented. When additives such as an ultraviolet light absorbent and an antioxidant are added to the resin having a negative intrinsic birefringence, vaporization of the additives during coextrusion or co-stretching and oozing out of the additives in the optical laminate can be prevented. By adding an antioxidant to the resin having a negative intrinsic birefringence which tends to be oxidized, degradation of the resin can be effectively prevented.

In the optical laminate of the present invention, an adhesive layer may be disposed between the layer comprising a resin having a negative intrinsic birefringence (layer A) and the layer comprising a transparent resin and having substantially no orientation (layer B).

The adhesive layer can be formed with an adhesive exhibiting affinity to both of layer A and layer B constituting the optical laminate. Examples of the adhesive include ethylene-(meth)acrylic ester copolymers such as ethylene-methyl(meth)acrylate copolymers and ethylene-ethyl(meth)acrylate copolymers; ethylene copolymers such as ethylene-vinyl acetate copolymers and ethylene-styrene copolymers; and other olefin polymers. Modified substances obtained by modifying the (co)polymers by oxidation, saponification, chlorination or chloro-sulfonation can also be used.

The thickness of the adhesive layer is preferably 1 to 50 µm and more preferably 2 to 30 µm.

When the optical laminate of the present invention comprises the adhesive layer, it is preferable that the glass transition temperature or the softening point Tg(D) of the adhesive in the adhesive layer is lower than Tg(A) and Tg(B) described above. It is more preferable that Tg(D) is lower than Tg(A) and Tg(B) by 15° C. or greater.

The process for producing the optical laminate used in the present invention is not particularly limited. The layer comprising a transparent resin and having substantially no orientation (layer B) is laminated on at least one face of the layer comprising the resin having a negative intrinsic birefringence (layer A) to form unstretched laminate (c), which is then stretched.

As the process for obtaining unstretched laminate (c), a conventional process can be suitably utilized. Examples of the conventional process include molding processes by coextrusion such as the coextrusion T-die process, the coextrusion inflation process and the coextrusion lamination process; molding processes by film lamination such as the dry lamination; and molding processes by coating such as coating of a resin film of the substrate with a resin solution. Among these processes, the molding process by coextrusion is preferable from the standpoint of the efficiency of production and removal of volatile components such as solvents from the film.

The temperature of extrusion can be suitably selected in accordance with the resin having a negative intrinsic birefringence, the transparent resin and the adhesive used where necessary.

The process for stretching unstretched laminate (c) is not particularly limited, and a conventional process can be applied. Examples of the process include uniaxial stretching processes such as the process of uniaxial stretching in the longitudinal direction utilizing the difference in the circumferential speed of rolls, and the process of uniaxial stretching in the transverse direction using a tenter; processes of biaxial stretching such as the process of simultaneous stretching comprising longitudinal stretching by increasing the distance between fixing clips and transverse stretching by an increase in the angle of opening of guide rails, and the process of successive stretching comprising longitudinal stretching utilizing the difference in the circumferential speed of rolls, followed by transverse stretching using a tenter by gripping both end portions by clips; and processes of oblique stretching such as the process using a tenter stretcher which can apply longitudinal or transverse feeding force, tensile force or winding force at different rightward and leftward speeds, or a tenter stretcher which has the same distance of movement with a fixed angle of stretching θ or has different distances of movement while longitudinal or transverse feeding force, tensile force or winding force can be applied at the same rightward and leftward speeds.

It is preferable that the temperature of stretching unstretched laminate (c) is in the range of Tg(A)−10 to Tg(A)+20 (° C.) and more preferably in the range of Tg(A)−5 to Tg(A)+15 (° C.) when the glass transition temperature of the resin having a negative intrinsic birefringence used for optical laminate (C) is represented by Tg(A) (° C.).

In optical laminate (C), when the glass transition temperature of the transparent resin Tg(B) is lower than the glass transition temperature of the resin having a negative intrinsic birefringence Tg(A) and the temperature of stretching of unstretched laminate (c) is in the above range, the in-plane retardation of the layer comprising the resin having a negative intrinsic birefringence (layer A) |Re(A)| and the in-plane retardation of the layer comprising the transparent resin and having substantially no orientation (layer B) |Re(B)| can satisfy the relation |Re(A)|>|Re(B)|, and the angle of field can be improved by adjusting the birefringences of the layers in accordance with the property of the liquid crystal cell.

It is preferable that the stretching ratio of unstretched laminate (c) is, in general, 1.05 to 30 and more preferably 1.1 to 10. When the stretching ration is outside the above range, there is the possibility that the orientation is insufficient to cause insufficient exhibition of anisotropy of the refractive index and, moreover, insufficient exhibition of the retardation and that the laminate is broken.

The optical element of the present invention comprises a laminate of the optical laminate of the present invention and a polarizer plate.

The polarizer plate used for the optical element of the present invention has the basic construction such that a transparent protective film as the protective layer is laminated to one or both faces of a polarizer comprising a polyvinyl alcohol-based polarizing film comprising a dichroic substance via a suitable adhesive layer.

As the polarizer, for example, a suitable polarizer which is obtained by subjecting a film comprising a suitable conventional vinyl alcohol-based polymer such as polyvinyl alcohol and polyvinyl alcohol with a partial formal treatment to suitable treatments such as the dying with dichroic substances such as iodine and dichroic dyes, the stretching treatment and the crosslinking treatment in a suitable order in accordance with suitable processes and transmits linearly polarized light on incidence of natural light, can be used. In particular, a polarizer exhibiting excellent transmission of light and degree of polarization is preferable. In general, the thickness of the polarizer is 5 to 80 µm. However, the thickness is not limited to this range.

As the protective film which forms the transparent protective layer disposed at one or both sides of the polarizer, a suitable transparent film can be used. In particular, films comprising a polymer exhibiting excellent transparency, mechanical strength, heat stability and property of screening moisture are preferable. Examples of the above polymer include acetate resins and polyester resins such as triacetyl-cellulose, polyether sulfone resins, polycarbonate resins, polyamide resins, polyimide resins, polyolefin resins, polymer resins having an alicyclic structure and acrylic resins. Among these polymers, acetate resins and polymer resins having an alicyclic structure are preferable due to the small birefringence, and polymer resins having an alicyclic structure are more preferably from the standpoint of the transparency, the small moisture absorption, the dimensional stability and the light weight.

The thickness of the transparent protective film can be selected as desired. In general, the thickness is 500 µm or smaller, preferably 5 to 300 µm and more preferably 5 to 150 µm so that the thickness of the polarizer plate can be decreased.

The optical laminate (C) and the polarizer plate can be laminated together by adhesion using a suitable means of adhesion such as an adhesive or a pressure sensitive adhesive. Examples of the adhesive and the pressure sensitive adhesive include acrylic, silicone-based, polyester-based, polyurethane-based, polyether-based and rubber-based adhesives and pressure sensitive adhesives. Among these adhesives and pressure sensitive adhesives, acrylic adhesives and pressure sensitive adhesives are preferable from the standpoint of the heat resistance and the transparency.

Optical laminate (C) and the polarizer plate are laminated together in a manner such that the slow axis of optical laminate (C) and the transmission axis of the polarizer are parallel or perpendicular with each other. Examples of the process for the lamination include conventional processes, such as the process of laminating optical laminate (C) and the polarizer plate which are each cut into a desired size, and the process of laminating long sheets of optical laminate (C) and the polarizer plate in accordance with the roll-to-roll process.

In optical laminate (C) of the present invention, layer B comprising the transparent resin and having substantially no orientation in optical laminate (C) of the present invention can be used also as the transparent protective film of the polarizer plate to be laminated so that the thickness of the member is decreased.

The thickness of the optical element of the present invention is, in general, 100 to 700 µm and preferably 200 to 600 µm.

The liquid crystal display device of the present invention is a liquid crystal display device using at least one sheet of the optical laminate of the present invention. The embodiments of the arrangement of optical laminate (C) of the present invention in the liquid crystal display device include an embodiment in which optical laminate (C) is disposed between the polarizer plate and the liquid crystal cell and an embodiment in which optical laminate (C) is disposed at the side of the polarizer plate opposite to the liquid crystal cell. In the embodiment in which optical laminate (C) is disposed between the polarizer plate and the liquid crystal cell, it is possible that the optical element of the present invention is disposed at the liquid cell.

The liquid crystal display device of the present invention may be formed as a device having a suitable conventional structure such as the device of the transmission type, the device of the reflection type and the device of the transmission and reflection type in which the polarizer plate is disposed at one or both sides of the liquid cell. Examples of the liquid crystal mode used for the liquid crystal cell include the in-plane switching (IPS) mode, the vertical alignment (VA) mode, the multi-domain vertical alignment (MVA) mode, the continuous pin wheel alignment (CPA) mode, the twisted nematic (TN) mode, the super twisted nematic (STN) mode, the hybrid alignment nematic (HAN) mode and the optical compensated bend (OCB) mode. In particular, the liquid crystal display device of the present invention can be advantageously be applied to the in-plane switching mode.

The liquid crystal display device of the in-plane switching mode comprises liquid crystal molecules homogeneously oriented in the horizontal direction and two polarizer plates having the transmission axes arranged in a manner such that one of the transmission axes is in the vertical direction and the other is in the horizontal direction with respect to the frontward direction of the display, and the two axes are perpendicular to each other. When the image display is observed obliquely in the horizontal and vertical directions, the two transmission axes are seen in positions perpendicular with each other. Since the homogenously oriented liquid crystal layer have little birefringence unlike the liquid crystal layer of the twisted mode, the sufficient contrast can be obtained.

In contrast, when the image display is observed in the oblique direction at an angle of 45°, the two transmission axes have relative positions such that the angle between the two transmission axes shifts from 90 degrees. The linear polarized light is not completely shut off, and leak of light arises. A sufficient dark display is not obtained, and the contrast decreases. By disposing optical laminate (C) between the two polarizer plates of the liquid crystal display device of the in-plane switching mode, the compensation of the phase contrast formed with the liquid crystals in the liquid crystal cell and the compensation of the perpendicular arrangement of the transmission axes of the two polarizer plates are made. Due to these compensations, the birefringence formed in the transmitted light is effectively compensated to prevent leak of light, and an excellent contrast can be obtained in observation in the entire angle of the field. This effect is considered to be exhibited in liquid crystal devices of other modes. The effect is remarkable, in particular, in the IPS mode described above.

In the liquid crystal display device of the present invention, one or more layers of suitable members such as a prism array sheet, a lens array sheet, a light diffusion plate, a back light and a brightness enhancement film can be disposed at suitable positions when the liquid crystal device is formed.

EXAMPLES

The present invention will be described more specifically with reference to examples in the following. However, the present invention is not limited to the examples.

The evaluations of optical laminates were conducted in accordance with the following methods.

(1) Unevenness in the Thickness of Layer A

After an optical laminate was embedded into an epoxy resin, the laminate was sliced into pieces having a thickness of 0.05 µm using a microtome [manufactured by YAMATO KOKI KOGYO Co., Ltd.; RUB-2100], and the thickness of layer A comprising a resin having a negative intrinsic birefringence was measured by observing the section using a transmission electron microscope. From the average value T, the maximum value $T_{MAX}$ and the minimum value $T_{MIN}$ of the thickness obtained by the measurement, the unevenness in the thickness was calculated in accordance with the following equation:

$$\text{Unevenness in thickness (\%)} = \{(T_{MAX} - T_{MIN})/T\} \times 100$$

(2) In-Plane Retardation Re

Using layer A comprising a resin having a negative intrinsic birefringence or layer B comprising a transparent resin and having substantially no orientation which was separated from an optical laminate or optical laminate C, the in-plane retardation was measured using an automatic birefringence meter [manufactured by OJI KEISOKUKIKI Co., Ltd.; KOBRA-21ADH].

(3) Glass Transition Temperature

The glass transition temperature was measured in accordance with the method of differential scanning calorimetry (DSC) described in Japanese Industrial Standard K 7121.

(4) Refractive Index

The refractive index was measured using an automatic birefringence meter [manufactured by OJI KEISOKUKIKI Co., Ltd.; KOBRA-21ADH].

(5) Viewing Angle Characteristics of Liquid Crystal Display Device

After an optical laminate is mounted into a liquid crystal display device of the in-plane switching (IPS) mode and the display characteristics are visually observed.

(6) Unevenness in Brightness

An optical laminate was placed between the polarizer plate and the liquid crystal panel in a liquid crystal display device of the in-plane switching (IPS) mode. The background of the display was adjusted to the dark display, and the presence or the absence of the unevenness in the brightness (the presence or the absence of white spots) was examined in a dark room. The evaluation was conducted in the frontward direction and in the horizontally and vertically oblique directions at 40 degrees.

Example 1

An unstretched laminate having layer b comprising a norbornene polymer [manufactured by NIPPON ZEON Co., Ltd.; ZEONOR 1020; the glass transition temperature: 105° C.], layer a comprising a styrene-maleic anhydride copolymer [manufactured by NOVA CHEMICAL JAPAN Co., Ltd.; DYLARK D332; the glass transition temperature: 130° C.; the content of oligomer components: 3% by weight] and layer d comprising an olefin polymer modified with maleic acid [manufactured by MITSUBISHI KAGAKU Co., Ltd.; MODIC AP F543A; the Vicat softening temperature: 55° C.] and having a structure of layer b (20 μm)-layer d (5 μm)-layer a (60 μm)-layer d (5 μm)-layer b (20 μm) was obtained in accordance with the co-extrusion molding. The obtained unstretched laminate was uniaxially stretched in the longitudinal direction by nip rolls at a temperature of stretching of 136° C., a speed of stretching of 120%/minute and a stretching ratio of 1.2, and an optical laminate which had a layer comprising a styrene-maleic anhydride copolymer having a negative intrinsic birefringence (layer A) and layers comprising a transparent norbornene polymer and having substantially no orientation (layer B) laminated to both faces of layer A via a layer comprising a modified ethylene-vinyl acetate copolymer (layer D) and had a thickness of 100 μm was obtained.

The obtained optical laminate had an in-plane retardation of layer A of 120 nm as measured with the light having a wavelength of 550 nm and a total of the in-plane retardations of two layer B of 0 nm as measured with the light having a wavelength of 550 nm. The in-plane retardations measured with the light having wavelengths of 450 nm, 550 nm and 650 nm were 148 nm, 120 nm and 110 nm, respectively. The refractive index of the optical laminate in the direction of the thickness measured with the light having a wavelength of 550 nm was Σnz=1.5800, and the refractive indices in the directions perpendicular to the direction of the thickness and perpendicular with each other were Σnx=1.5788 and Σny=1.5800. The unevenness in the thickness of layer A was 1.0% of the average thickness of layer A.

Uniaxially stretched phase contrast film E having a thickness of 100 μm was obtained by uniaxially stretching an unstretched film comprising a norbornene polymer [manufactured by NIPPON ZEON Co., Ltd.; ZEONOR 1420; the glass transition temperature: 135° C.] at a temperature of 139° C. and at a stretching ratio of 1.1 by nip rolls in the longitudinal direction. The refractive indices of uniaxially stretched phase contrast film E were nx=1.5312, ny=1.5300 and nz=1.5300 as measured with the light having a wavelength of 550 nm.

An optical element obtained by cutting out of a wound product which was a laminate of the above optical laminate and a polarizer plate having the transmission axis in the longitudinal direction prepared by lamination in accordance with the roll-to-roll process was used in place of the polarizer plate at the incident side of a commercial liquid crystal display device of the in-plane switching (IPS) mode and mounted in combination with uniaxially stretched phase contrast film E in a manner such that the optical laminate was placed at the side of the liquid crystal cell and uniaxially stretched film E was adjacent to the liquid crystal cell. At this time, the arrangement was made so that the slow axis of the optical laminate and the slow axis of uniaxially stretched film E were each perpendicular to the transmission axis of the polarizer plate at the output side. When the characteristics of display of the obtained liquid crystal display device were evaluated by visual observation, the image display was excellent and uniform in observation in the frontward direction and in any oblique directions within a polar angle of 80°.

When the unevenness in the brightness was evaluated using the above optical laminate, no unevenness in the brightness was found in observation in the frontward direction and in any horizontally and vertically oblique directions at an angle of 40°.

Example 2

An unstretched laminate having layer b comprising a norbornene polymer [manufactured by NIPPON ZEON Co., Ltd.; ZEONOR 1060; the glass transition temperature: 100° C.], layer a comprising a styrene-maleic anhydride copolymer [manufactured by NOVA CHEMICAL JAPAN Co., Ltd.; DYLARK D332; the glass transition temperature: 130° C.; the content of oligomer components: 3% by weight] and layer d comprising an olefin polymer modified with a maleic acid [manufactured by MITSUBISHI KAGAKU Co., Ltd.; MODIC AP F543A; the Vicat softening temperature: 55° C.] and having a structure of layer b (32 μm)-layer d (7 μm)-layer a (48 μm)-layer d (7 μm)-layer b (32 μm) was obtained in accordance with the co-extrusion molding.

The obtained unstretched laminate was stretched in the longitudinal direction by rolls at a temperature of stretching of 134° C., a speed of stretching of 107%/minute and a stretching ratio of 1.3 and then in the direction perpendicular to the direction of the above stretching by a tenter at a temperature of stretching of 133° C., a speed of stretching of 110%/minute and a stretching ratio of 1.2, and an optical laminate having a thickness of 100 μm was obtained. A test piece having a square shape having a length of the edge of 50 mm was cut out of the central portion of the obtained optical laminate and evaluated.

The obtained optical laminate had an in-plane retardation of layer A of 50 nm as measured with the light having a wavelength of 550 nm and a total of the in-plane retardations of two layer B of 0 nm as measured with the light having a wavelength of 550 nm. The in-plane retardations measured with the light having wavelengths of 450 nm, 550 nm and 650 nm were 62 nm, 50 nm and 46 nm, respectively. The refractive index of the optical laminate in the direction of the thickness measured with the light having a wavelength of 550 nm was $\Sigma nz=1.5798$, and the refractive indices in the directions perpendicular to the direction of the thickness and perpendicular with each other were $\Sigma nx=1.5777$ and $\Sigma ny=1.5782$. The unevenness in the thickness of layer A was 1.0% of the average thickness of layer A.

In accordance with the same procedures as those conducted in Example 1, an optical element obtained by cutting out of a wound product which was a laminate of the above optical laminate and a polarizer plate having the transmission axis in the longitudinal direction prepared by lamination in accordance with the roll-to-roll process was used in place of the polarizer plate at the incident side of a commercial liquid crystal display device of the in-plane switching (IPS) mode and mounted in a manner such that the optical laminate was adjacent to the liquid crystal cell. At this time, the arrangement was made so that the slow axis of the optical laminate and the transmission axis of the polarizer plate at the output side were perpendicular with each other. When the characteristics of display of the obtained liquid crystal display device were evaluated by visual observation, the image display was excellent and uniform in observation in the frontward direction and in any oblique directions within a polar angle of 80°.

When the unevenness in the brightness was evaluated using the above optical laminate, no unevenness in the brightness was found in observation in the frontward direction and in any horizontally and vertically oblique directions at an angle of 40°.

Comparative Example 1

An unstretched laminate having layer b comprising a norbornene polymer [manufactured by NIPPON ZEON Co., Ltd.; ZEONOR 1430; the glass transition temperature: 135° C.], layer a comprising a styrene-maleic anhydride copolymer [manufactured by NOVA CHEMICAL JAPAN Co., Ltd.; DYLARK D332; the glass transition temperature: 130° C.; the content of oligomer components: 3% by weight] and layer d comprising an olefin polymer modified with a maleic acid [manufactured by MITSUBISHI KAGAKU Co., Ltd.; MODIC AP F543A; the Vicat softening temperature: 55° C.] and having a structure of layer b (35 µm)-layer d (9 µm)-layer a (46 µm)-layer d (9 µm)-layer b (35 µm) was obtained in accordance with the co-extrusion molding. The obtained unstretched laminate was uniaxially stretched in the longitudinal direction by nip rolls at a temperature of stretching of 136° C., a speed of stretching of 130%/minute and a stretching ratio of 1.8, and an optical laminate having a thickness of 100 µm was obtained.

The obtained optical laminate had an in-plane retardation of layer A of 490 nm as measured with the light having a wavelength of 550 nm and a total of the in-plane retardations of two layer B of 630 nm as measured with the light having a wavelength of 550 nm. The in-plane retardations measured with the light having wavelengths of 450 nm, 550 nm and 650 nm were 113 nm, 140 nm and 152 nm, respectively. The refractive index of the optical laminate in the direction of the thickness measured with the light having a wavelength of 550 nm was $\Sigma nz=1.5521$, and the refractive indices in the directions perpendicular to the direction of the thickness and perpendicular with each other were $\Sigma nx=1.5521$ and $\Sigma ny=1.5535$. The unevenness in the thickness of layer A was 4.0% of the average thickness of layer A.

In accordance with the same procedures as those conducted in Example 1, an optical element obtained by cutting out of a wound product which was a laminate of the above optical laminate and a polarizer plate having the transmission axis in the longitudinal direction prepared by lamination in accordance with the roll-to-roll process was used in place of the polarizer plate at the incident side of a commercial liquid crystal display device of the in-plane switching (IPS) mode and mounted in combination with uniaxially stretched phase contrast film E in a manner such that the optical laminate was at the side of the liquid crystal cell and uniaxially stretched phase contrast film E was adjacent to the liquid crystal cell. When the characteristics of display of the obtained liquid crystal display device were evaluated by visual observation, the contrast decreased in observation in any oblique directions within a polar angle of 80° in comparison with that of a liquid crystal display device not using the optical laminate. Unevennesses were found in the entire face of the display.

When the unevenness in the brightness was evaluated using the above optical laminate, unevennesses in the brightness (white spots) were found in observation in the frontward direction and in the horizontal directions at an angle of 40°. Unevennesses in the brightness were found in observation in the vertically oblique directions at an angle of 40°.

The glass transition temperature of the resins and the retardation of the optical laminates used in Examples 1 and 2 and Comparative Example 1 are shown in Table 1. The refractive index, the unevenness in the thickness and the characteristics of display of the liquid crystal display devices in which the optical laminate was mounted are shown in Table 2.

TABLE 1

|  | Tg(A) (° C.) | Tg(B) (° C.) | Re(A) (nm) | Re(B) (nm) | Re(450) (nm) | Re(550) (nm) | Re(650) (nm) |
| --- | --- | --- | --- | --- | --- | --- | --- |
| Example 1 | 130 | 105 | 120 | 0 | 148 | 120 | 110 |
| Example 2 | 130 | 100 | 50 | 0 | 62 | 50 | 46 |
| Comparative Example 1 | 130 | 135 | 490 | 630 | 113 | 140 | 152 |

TABLE 2

|  | $\Sigma nx$ | $\Sigma ny$ | $\Sigma nz$ | Unevenness in thickness (%) | Characteristics of display |
| --- | --- | --- | --- | --- | --- |
| Example 1 | 1.5788 | 1.5800 | 1.5800 | 1.0 | excellent |
| Example 2 | 1.5777 | 1.5782 | 1.5798 | 1.0 | excellent |
| Comparative Example 1 | 1.5521 | 1.5535 | 1.5521 | 4.0 | poor |

As shown in Table 1, in the optical laminates of Examples 1 and 2 prepared by laminating the layer comprising the transparent resin having a glass transition temperature of 105° C. or 100° C. (layer B) to both faces of the layer comprising the resin having a glass transition temperature of 130° C. and a negative intrinsic birefringence, the in-plane retardation of layer B was 0 nm, and the in-plane retardation of layer A was greater than the in-plane retardation of layer B. The relation $\Sigma nz > \Sigma ny - 0.002$ was satisfied, and the unevenness in the thickness of layer A was small. The liquid crystal display devices in which the optical element obtained by laminating the optical laminate of Examples 1 or 2 with the polarizer plate was mounted exhibited excellent characteristics of display.

In contrast, in the optical laminates of Comparative Example 1 prepared by laminating the layer comprising the transparent resin having a glass transition temperature of 135° C. (layer B) to both faces of the layer comprising the resin having a glass transition temperature of 130° C. and a negative intrinsic birefringence, the in-plane retardation of layer B was 630 nm, and the in-plane retardation of layer A was smaller than the in-plane retardation of layer B. The unevenness in the thickness of layer A was great. The liquid crystal display device in which the optical element obtained by laminating the optical laminate of Comparative Example 1 with the polarizer plate was mounted exhibited poor characteristics of display.

INDUSTRIAL APPLICABILITY

Since the optical laminate of the present invention provides an excellent efficiency of production and easy control of the phase contrast, compensation of the birefringence is made possible to a great degree. The optical laminate exhibits no unevenness in the brightness or unevenness in the color, has a great angle of field and provides uniform and excellent contrast in observation in any direction. Therefore, the optical laminate can be used advantageously for flat panel displays having a great size.

The invention claimed is:

1. An optical laminate (optical laminate C) which comprises a layer (layer A) comprising a resin having a negative intrinsic birefringence and at least one layer (layer B) comprising a transparent resin, having substantially no orientation and laminated at least on one face of layer A and satisfies a relation |Re(A)|>|Re(B)| and a relation |Re(A)|+ |Re(B)|<1.1×|Re(A)|, wherein Re(A) and Re(B) represent an in-plane retardation of layer A and an in-plane retardation of layer B, respectively, measured with light having a wavelength of 400 to 700 nm,
   wherein the optical laminate satisfies a relation Re(450) >Re(550)>Re(650), wherein Re(450), Re(550) and Re(650) represent in-plane retardations at wavelengths of 450 nm, 550 nm and 650 nm, respectively,
   wherein the optical laminate C is obtained by co-stretching an unstretched laminate comprising an unstretched resin layer comprising the transparent resin and having substantially no orientation and an unstretched resin layer comprising the resin having a negative intrinsic birefringence, said unstretched resin layer comprising the transparent resin and having substantially no orientation being laminated on at least one face of the layer comprising the resin having a negative intrinsic birefringence,
   wherein the unstretched laminate is co-stretched at a temperature of from Tg(A)−10 (° C.) to Tg(A)+20 (° C.), wherein Tg(A) and Tg(B) represent glass transition temperatures in ° C. of the resin of layer A and the resin of layer B, respectively, and
   wherein glass transition temperatures Tg(A) and Tg(B) in ° C. of the resin of layer A and the resin of layer B, respectively, satisfies a relation: Tg(B)+30>Tg(A)>Tg(B)+20.

2. The optical laminate according to claim 1, wherein |Re(B)| is 20 nm or smaller.

3. The optical laminate according to claim 1, which satisfies a relation Σnz>Σny−0.002, wherein Σnz represents a refractive index in a direction of a thickness and Σny and Σnx represent refractive indices in two directions which are perpendicular to the direction of a thickness and perpendicular to each other of optical laminate C measured with light having a wavelength of 550 nm, and Σnx, Σny and Σnz satisfy relations Σnx<Σny and Σnx<Σnz.

4. The optical laminate according to claim 1, wherein an unevenness in a thickness of layer A is 3.0% or smaller of an average thickness of layer A.

5. The optical laminate according to claim 1, wherein the resin having a negative intrinsic birefringence is a resin selected from a group consisting of vinyl aromatic polymers, polyacrylonitrile polymers and polymethyl methacrylate polymers.

6. The optical laminate according to claim 1, wherein the resin having a negative intrinsic birefringence is a vinyl aromatic polymer.

7. The optical laminate according to claim 1, wherein the resin having a negative intrinsic birefringence is a resin selected from a group consisting of polystyrene and copolymers of styrene and maleic anhydride.

8. The optical laminate according to claim 1, wherein the transparent resin is a resin having an alicyclic structure.

9. The optical laminate according to claim 1, wherein the transparent resin is a norbornene polymer.

10. The optical laminate according to claim 1, wherein the transparent resin is a hydrogenation product of a ring-opening polymer of a norbornene monomer or a hydrogenation product of a ring-opening copolymer of a norbornene monomer.

11. The optical laminate according to claim 10, wherein the resin having a negative intrinsic birefringence is a copolymer of styrene with maleic anhydride.

12. The optical laminate according to claim 1, wherein the transparent resin has a tensile elongation at break of 30% or greater.

13. The optical laminate according to claim 1, wherein the layer comprising a transparent resin and having substantially no orientation (layer B) is laminated on both faces of the layer comprising a resin having a negative intrinsic birefringence (layer A).

14. The optical laminate according to claim 1, wherein an adhesive layer is disposed between the layer comprising a resin having a negative intrinsic birefringence (layer A) and the layer comprising a transparent resin and having substantially no orientation (layer B).

15. The optical laminate according to claim 14, which satisfies relations Tg(A)>Tg(D) and Tg(B)>Tg(D), wherein Tg(D) represents a glass transition temperature or a softening point in ° C. of an adhesive in the adhesive layer, and wherein Tg(A) and Tg(B) represent glass transition temperatures in ° C. of the resin of layer A and the resin of layer B, respectively.

16. An optical element comprising a laminate of the optical laminate described in claim 1 and a polarizer plate.

17. A liquid crystal display device which uses at least one sheet of the optical laminate described in claim 1.

18. The liquid crystal display device according to claim 17, wherein said liquid crystal display device comprises a liquid crystal cell of in-plane switching (IPS) mode.

19. The optical laminate according to claim 1, wherein the unstretched laminate is obtained by a molding process by coextrusion of the resin having a negative intrinsic birefringence and the transparent resin.

20. A process for producing an optical laminate (optical laminate C) which comprises a layer (layer A) comprising a resin having a negative intrinsic birefringence and at least one layer (layer B) comprising a transparent resin, having substantially no orientation and laminated at least on one face of layer A and satisfies a relation |Re(A)|>|Re(B)| and a relation |Re(A)|+|Re(B)|≤1.1×|Re(A)|, wherein Re(A) and Re(B) represent an in-plane retardation of layer A and an in-plane retardation of layer B, respectively, measured with light having a wavelength of 400 to 700 nm, wherein the optical laminate satisfies a relation Re(450)>Re(550)>Re(650), wherein Re(450), Re(550) and Re(650) represent in-plane retardations at wavelengths of 450 nm, 550 nm and 650 nm, respectively, wherein said process comprises:

laminating a layer comprising a transparent resin and having substantially no orientation on at least one face of the layer comprising the resin having a negative intrinsic birefringence to form an unstretched laminate, and co-stretching the formed unstretched laminate at a temperature of from Tg(A)−10 (° C.) to Tg(A)+20 (° C.), forming the optical laminate, wherein Tg(A) and Tg(B) represent glass transition temperatures in ° C. of the resin of layer A and the resin of layer B, respectively, and satisfy a relation Tg(B)+30>Tg(A)>Tg(B)+20.

* * * * *